Aug. 29, 1939.  P. VAN SITTERT  2,171,316
MULTIPLE-WAY VALVE
Filed Jan. 21, 1937
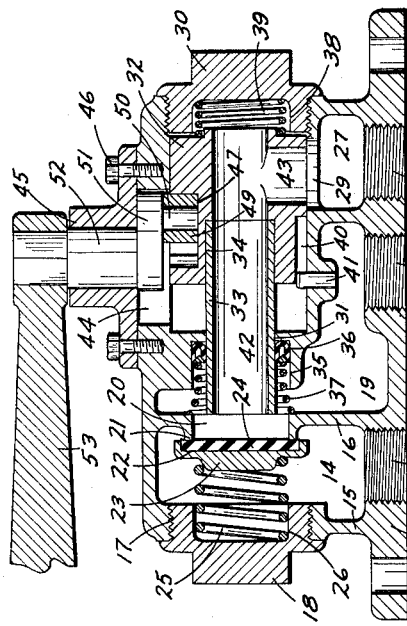
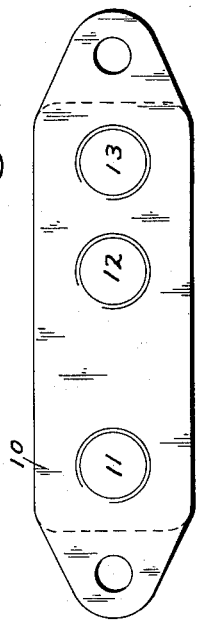
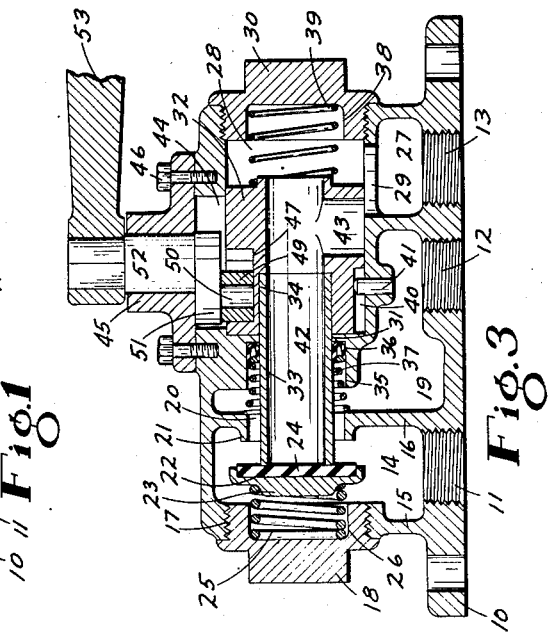
PAUL VAN SITTERT
INVENTOR
BY John E. Renfer
ATTORNEY Patented Aug. 29, 1939

2,171,316

UNITED STATES PATENT OFFICE 2,171,316

MULTIPLE-WAY VALVE

Paul Van Sittert, Cleveland Heights, Ohio, assignor to The Cleveland Pneumatic Tool Company, Cleveland, Ohio, a corporation of Ohio Application January 21, 1937, Serial No. 121,623

3 Claims. (Cl. 277—20)

This invention relates broadly to valves, but more particularly to improvements in multiple-way valves used for controlling the flow of fluid through pipes.

One object of this invention is to produce a novel valve of simple and efficient construction especially adapted for controlling the supply and exhaust of fluid through pipes or pipe lines.

Another object of this invention is to produce a valve wherein the movable parts are accessible without necessitating the disconnection of the many conduits attached to the valve casing, thus facilitating the inspection or service of these parts and consequently reducing the cost of maintenance.

Another object of this invention is to produce a valve wherein all the movable parts are enclosed within the valve casing for protection against dust or grit and the deleterious effect thereof.

Other objects and advantages more or less ancillary to the foregoing reside in the specific construction and aggroupment of the elements peculiar to this structure, as will become apparent from a more complete examination of this specification.

In the drawing:

Figs. 1, 2 and 3 are longitudinal sectional views of the valve assembly illustrating movable parts in different positions.

Fig. 4 is a portion of a sectional view taken in a plane indicated by line 4—4 in Fig. 2.

Fig. 5 is an end view of the valve.

Referring to the drawing in which like symbols designate corresponding parts throughout the several views, 10 represents a casing having three threaded bores or connections 11, 12 and 13, each adapted to receive the corresponding end of a pipe or conduit (not shown). The connection 11 opens into an inlet chamber 14 formed between two side walls 15 and 16, the wall 15 having a threaded bore 17 within which is screwed from the exterior of the casing a removable plug 18.

The connection 12 opens into an outlet chamber 19, which is capable of communication with the chamber 14 through an orifice 20 formed through the wall 16 and disposed coaxially with the plug 18. Within the inlet chamber 14, the orifice 20 is surrounded by an annular ridge forming a valve seat 21, with which a disk valve, generally designated by 22, is engageable. This disk valve comprises a metal cage 23 having removably mounted therein a rubber disk 24 protruding somewhat therefrom for engagement with the valve seat 21. The cage 23 is formed with a reduced portion adapted to receive one end of a compression spring 25, which has its other end mounted within a counterbore 26 formed within the plug 18.

The connection 13 opens into an exhaust chamber 27 which is capable of communication with a cylindrical bore 28 through a port 29. The bore 28 is formed within the casing 10 in coaxial alignment with the orifice 20, and has one end closed by a removable plug 30, while the other end thereof opens into the chamber 19 through a smaller bore 31.

Slidably mounted within the bore 28, there is a valve member 32 formed with a sleeve portion 33 extending through the bore 31 for end engagement with the disk valve 22. This sleeve 33 is of a diameter materially smaller than that of the orifice 20, and for purpose of manufacture it may be made out of a piece of tubing pressed into the valve member 32 as at 34. Surrounding the sleeve 33 within the chamber 19, there is a stuffing box like construction including a counterbore 35 having seated on the bottom thereof a U-shaped packing 36, which is pressed in fluid tight engagement with the casing and the sleeve by a compression spring 37. The plug 30, like the plug 18, is also formed with a counterbore 38 accommodating one end portion of a compression spring 39, which spring engages the adjacent end of the valve member 32. The spring 39 is made of a spring wire smaller than that of the spring 25, and is consequently weaker than the spring 25. For locking the valve member 32 against rotation relative to the casing 10, the former is provided with a key slot 40 accommodating one end of a pin 41 carried by the casing 10. Extending through the valve member 32, there is a passage 42 capable of communication with the port 29 through a radially disposed port 43.

Extending through the upper wall of the casing 10, there is an opening 44 opening into the bore 28 and normally closed by a cover 45 secured to the casing by cap screws 46. Adjacent the opening, the valve member 32 is provided with a transversal slot 47 forming two straight side walls 54 and 55, each formed with a notch or arcuated depression 48. Within the slot 47, there is mounted a roller 49 carried by one arm 50 of a crank 51, which crank has another arm 52 rotatably mounted within the cover 45 and protruding therefrom to receive a handle 53. The crank 51 is swingingly mounted within the opening 44 for actuating the valve member 32 as will be explained hereinafter.

The operation of the valve is as follows: Assuming that pressure fluid is admitted into the inlet chamber 14 through the connection 11, and that the handle 53 is located to position the roller 49 as shown in Fig. 4, the movable parts of the valve will assume the position shown in Fig. 1. In this instance, the pressure fluid acting on the cage 23 of the disk valve 22 will cooperate with the spring 25 for maintaining the resilient disk 24 in fluid tight engagement with the valve seat 21, and thereby preventing communication of the inlet chamber 14 with the outlet chamber 19. Simultaneously, the spring 39 acting on the valve member 32, will maintain the end of the sleeve 33 in fluid tight engagement with the disk 24, thus preventing communication of the outlet chamber 19 with the exhaust chamber 27.

When the handle 53 is rotated into the position shown in Fig. 3, the roller 49 acting on the side wall 54 of the slot 47 will cause the movable parts of the valve to assume the position shown in Fig. 3. In this instance, the end of the sleeve 33 engaging the disk valve 22, will cause the latter to leave its valve seat 21, allowing thereby the pressure fluid to flow from the inlet chamber 14 through the outlet connection 12 via the orifice 20 and the outlet chamber 19. Simultaneously, the end of the sleeve 33 engaging the disk 24 will prevent communication of either chambers 14 or 19 with the exhaust chamber 27.

When it is desired to exhaust the pressure fluid previously admitted into the outlet connection 12, the handle 53 may be rotated into the position shown in Fig. 2. During the rotation of the handle, the roller 49 acting on the side wall 55 of the slot 47 will cause the movable parts of the valve to assume the position shown in Fig. 2. In this instance, the disk valve 22 is again maintained in fluid tight engagement with the valve seat 21 due to the effort of the compression spring 25, thereby closing the inlet chamber 14. Simultaneously, the fluid previously admitted into the connection 12, is free to exhaust therefrom through the exhaust connection 13 via the chamber 19, the valve passage 42, the ports 43 and 29 and the exhaust chamber 27.

When the handle 53 is positioned as shown in Figs. 2 and 3, the roller 49 of the crank 51 is positioned within either of the notches 48, with the crank 51 positioned perpendicularly relative to the slot 47. The arc defining the notches 48 is somewhat smaller than the arc of travel of the roller 49 resulting from the swinging movement of the crank 51, thus causing the corner of the notch within which the roller is disposed to engage the roller for locking the crank 51 and the handle 53 against accidental rotation. When rotating the handle 53 from the position shown either in Fig. 2 or Fig. 3 into the position shown in Fig. 1, the roller acting on the corner of the notch within which it is disposed will cause a slight movement of the valve member 32 against the compression of either the spring 25 or 37. After passing over the corner of the notch, the roller 49 will snap into the position shown in Fig. 4 due to the action of the springs 25 and 39 on the disk valve 22 and valve member 32 respectively.

From the foregoing description, it is evident that the valve member is constantly urged and normally maintained in a closed position due to the effort of the springs 25 and 39. Due to the action of these two springs, the valve member is also maintained in exhaust open position as shown in Fig. 2 or in inlet open position as shown in Fig. 3.

It will also be understood that the valve member 32 and the disk valve 22 may be inspected or removed from the casing by simply removing the plugs 30 and 18 respectively.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:
1. In a device of the character described, a casing having a wall formed with an orifice extending therethrough, a valve seat, a valve engageable with said valve seat for closing said orifice, an element slidable within said casing having a port extending through one end thereof, said element being engageable with said valve for closing said port, spring means associated with said valve and element for effecting the engagements aforesaid, means for shifting said element in valve open position relative to said orifice while said port remains closed by said valve and in port open position while said orifice remains closed by said valve, and means responsive to the action of said spring means for locking said element in either of said positions.

2. In a device of the character described, a casing formed with an inlet, an outlet and an exhaust chamber, an annular stationary valve seat within said inlet chamber having an orifice leading therefrom into said outlet chamber, a spring pressed disk valve having a sealing face normally engaging said seat for closing said orifice, and a slidable element within said casing having a port therethrough affording communication between said outlet and exhaust chambers, said element being engageable with the sealing surface of said valve for opening said orifice and simultaneously closing said port and movable away from said valve for opening said port.

3. In a device of the character described, a casing, an annular valve seat within said casing having an inlet port internally thereof, a valve having a sealing face engageable with said seat for closing said port, means associated with said valve for urging it in operative engagement with said seat, and a slidable element within said casing formed with an exhaust port, said element being engageable with the sealing face of said valve for opening said inlet port and closing said exhaust port and movable away from said valve for opening said exhaust port.

PAUL VAN SITTERT.